United States Patent [19]

Severtson

[11] Patent Number: 4,986,782
[45] Date of Patent: Jan. 22, 1991

[54] LIQUID FLOW DETECTOR SYSTEM

[76] Inventor: Lyndon W. Severtson, R.R. 2, Box 120, Hills, Minn. 56138

[21] Appl. No.: 440,721

[22] Filed: Nov. 24, 1989

[51] Int. Cl.$^5$ .............................................. B67D 5/38
[52] U.S. Cl. .................................... 239/74; 137/554; 340/606
[58] Field of Search .................... 239/71, 74, 146, 159, 239/175; 137/554; 340/606; 73/861.08; 222/40

[56] References Cited

U.S. PATENT DOCUMENTS

| | | | |
|---|---|---|---|
| 2,869,368 | 1/1959 | Brown | 73/304 |
| 3,242,729 | 3/1966 | Keller | 73/861.08 |
| 3,425,628 | 2/1969 | Reams | 239/168 |
| 3,450,984 | 6/1969 | Holmes | 73/861.08 |
| 4,052,003 | 10/1977 | Steffen | 239/71 |
| 4,084,748 | 4/1978 | Anderson et al. | 239/74 |
| 4,115,877 | 9/1978 | Wall | 4/172 |
| 4,182,363 | 1/1980 | Fuller | 137/392 |
| 4,193,356 | 3/1980 | Vehe et al. | 239/74 |
| 4,430,886 | 2/1984 | Rood | 73/37 |
| 4,530,463 | 7/1985 | Hiniker et al. | 239/71 |
| 4,530,465 | 7/1985 | Gauchet et al. | 239/127 |
| 4,553,702 | 11/1985 | Coffee et al. | 239/690 |
| 4,559,831 | 12/1985 | Prestele | 73/861.08 |
| 4,777,832 | 10/1988 | Prodosmo et al. | 73/863 |
| 4,821,769 | 4/1989 | Mills et al. | 137/554 |
| 4,932,232 | 6/1990 | Ballyns et al. | 239/74 |

Primary Examiner—Andres Kashnikow
Assistant Examiner—Michael J. Forman
Attorney, Agent, or Firm—Kinney & Lange

[57] ABSTRACT

In a wheel-mounted sprayer for depositing liquid agricultural chemicals from storage tanks through feeder conduits and multiple spaced-apart spray heads or nozzles onto the ground, a liquid flow detector flow system includes a primary feeder tube forming a part of each feeder conduit, a secondary feeder tube having a larger diameter than the primary feeder tube and being open to the primary feeder tube and to the upper end of a spray nozzle, the feeder conduit being formed into an upwardly extending loop with the primary feeder tube being connected to the secondary feed toward the top of the loop. A pair of adjacent flow detector electrodes extend through an upper portion of the secondary feeder tube near the top of the loop on the downward flow side, and electrical means detects the presence or absence of electron flow between each pair of electrodes.

7 Claims, 3 Drawing Sheets

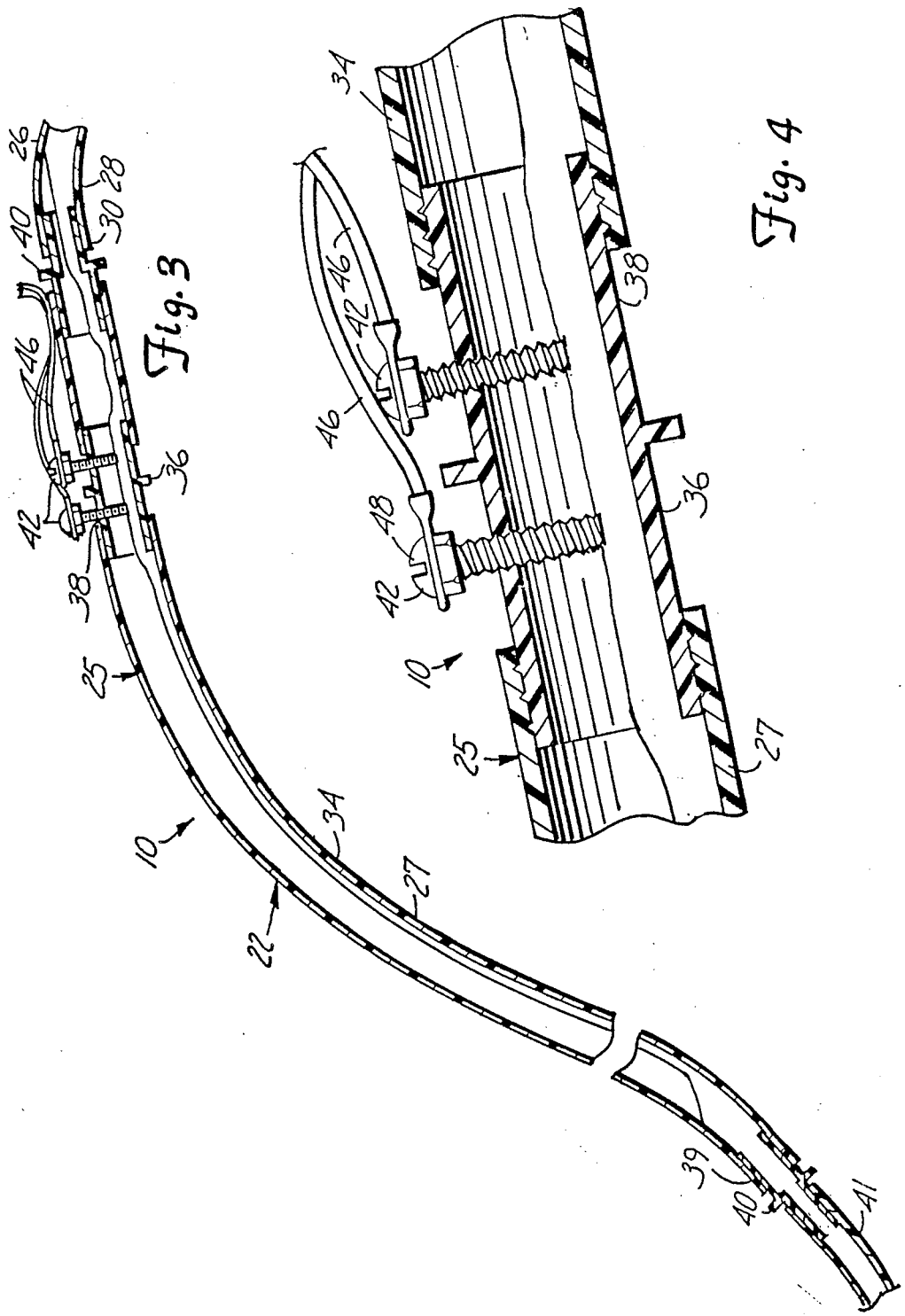

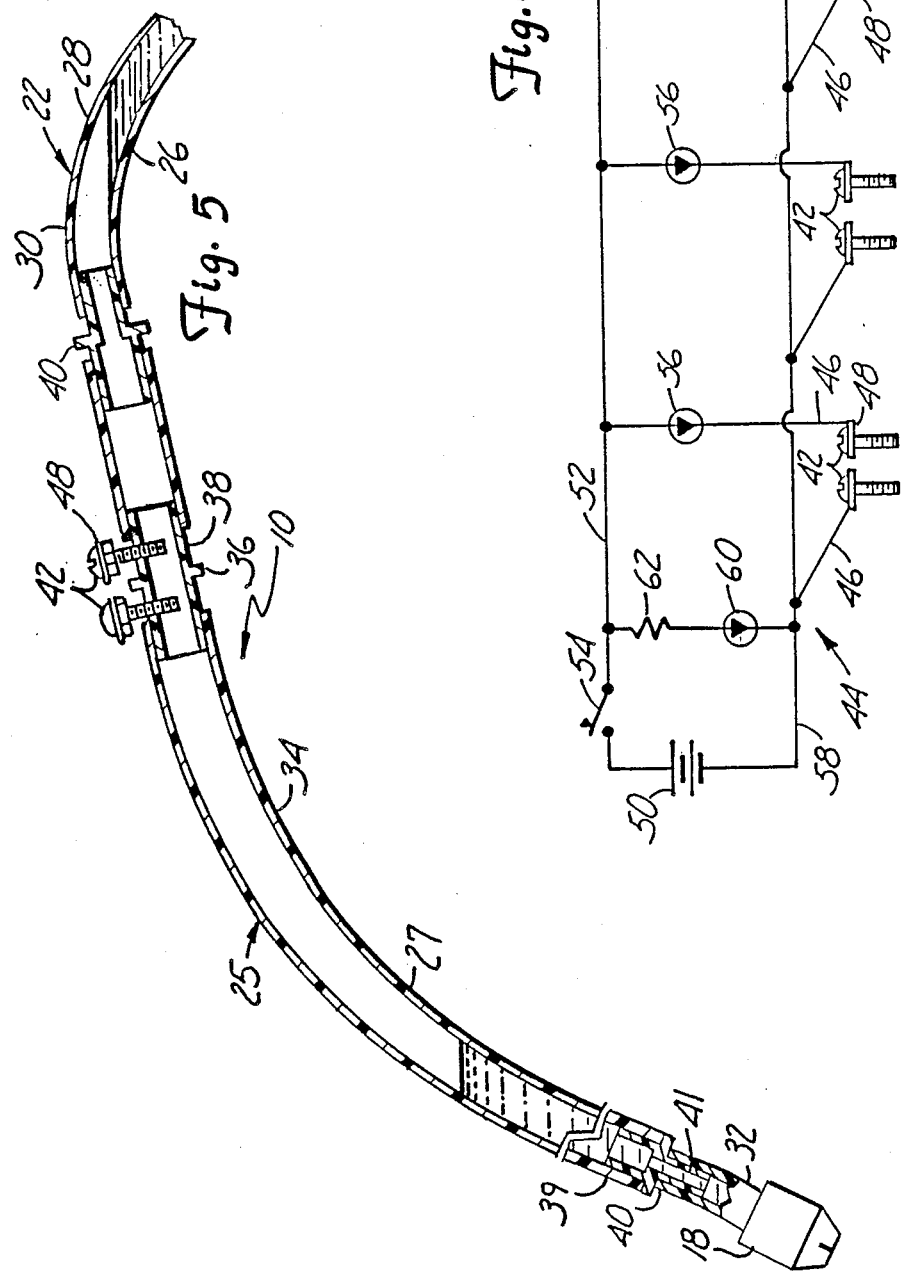

LIQUID FLOW DETECTOR SYSTEM

BACKGROUND OF THE INVENTION

1. Field of the Invention

This invention has relation to wheel mounted field sprayers for application of liquid agricultural chemicals to the ground through a plurality of transversely spaced-apart nozzles, and more specifically to the monitoring of flow and the detection of the absence of liquid flow through each individual nozzle.

2. Description of the Prior Art

It is known to spray agricultural chemicals through a plurality of spaced-apart nozzles as tractors or other prime movers propel spray booms over the ground. See U.S. Pat. No. 3,425,628 granted to Reams on Feb. 4, 1969, and U.S. Pat. No. 4,553,702 granted to Coffee et al. on Nov. 19, 1985.

The patent to Coffee et al. shows liquid detectors between the storage tanks and the boom and are for the purpose of sensing as to whether or not a particular chemical is being added to the mixture. In that patent are disclosed liquid detection devices 216 and 217 which merely report the presence or absence of liquid in a conduit. They cannot determine whether there is flow through the conduit. Further, there is no suggestion of the use of a trapped "air bubble" to deprive electrodes of contact with liquid whenever there is no flow of liquid in a conduit.

U.S. Pat. No. 4,430,886 granted to Rood on Feb. 14, 1984, shows the use of a reduction in pressure drop between an upstream restrictor and a downstream ON-OFF valve to indicate a partially closed nozzle. Rather than detect the presence or absence of flow in one of a multiplicity of nozzles, this invention measures the pressure in one nozzle.

U.S. Pat. No. 2,869,368 granted to Brown on Jan. 20, 1959, senses the presence of a liquid at various levels in the tank by using a multiplicity of vertically spaced electrodes. The patent is not concerned with the flow of liquid through a conduit or a tank, but is concerned merely with establishing the level of liquid existing in the tank at a particular point in time.

U.S. Pat. No. 4,115,877 granted to Wall on Sept. 26, 1978, shows the use of an electrode which can be submerged into a liquid in a U-tube. The change in capacitance between the electrode and a side wall surrounding the electrode indicates the liquid level in the tube. The patent is not concerned with the monitoring of flow and the signalling of lack of flow in each one of a multiplicity of tubes or conduits.

U.S. Pat. No. 4,777,832 granted to Prodosmo et al. on Oct. 18, 1988, is also concerned with indicating a level of a liquid in a vessel, using the presence of water in a U-tube. It is not related to detecting and indicating flow and lack of flow in a tube.

U.S. Pat. No. 4,182,363 granted to Fuller on Jan. 8, 1980, shows the use of electrodes at various heights to indicate and control the height of liquid in a reservoir. It does not detect, and cannot detect, the presence and absence of flow in a tube.

U.S. Pat. No. 4,052,003 granted to Steffen on Oct. 4, 1977, discloses a pressure sensor developing an electrical signal related to the pressure in a spray bar. This monitoring of the total pressure supplied to all nozzles does not show or suggest how to detect the cessation of flow in any individual nozzle. The concept of using an air bubble to detect and indicate flow and lack of flow is not shown or suggested.

U.S. Pat. No. 4,530,465 granted to Gauchet et al. on July 23, 1985, shows a flow rate sensor which regulates pressure of liquid being delivered to all of the spray heads. This is done by measuring the time required for emptying a predetermined volume of fluid (column 3, lines 1–3 and column 5, lines 31–33). There are no means here of indicating stoppage of flow to individual spray heads.

The foregoing patents were uncovered in a preliminary search made in the records of the United States Patent and Trademark Office.

There are mechanical devices used for the same purpose, some of which are believed to be spring operated for example. The details of these are unknown to the inventor and those in privity with him. It is believed that these are very complicated and/or expensive compared to the device of the present invention, and they have not found favor in the marketplace.

The present inventor experimented earlier with infrared emitters and detectors in an attempt to monitor and detect cessation of flow to individual nozzles, but abandoned any attempt to use optical sensors because of the problem of finding a remote location to monitor each nozzle. Also, because of the environment in which such detectors must work, the ends of the light fibers or glass lenses collect dust, spray mist and suspended agricultural powders, become dirty and, therefore, rapidly become inoperative.

The inventor and those in privity with him are aware of no prior art closer than that discussed above; and are aware of no prior art or combination thereof which anticipates the claims herein.

SUMMARY OF THE INVENTION

For use in an apparatus for moving a liquid with at least some electrical conductivity from a supply tank simultaneously through a plurality of feeder conduits and out through a plurality of downwardly opening nozzles, the invention is a liquid flow detector system for detecting and indicating to an operator of such apparatus, individually as to each of nozzles, the presence or absence of flow through that nozzle.

In the liquid flow detector system of the invention, a primary feeder tube forms a part of each feeder conduit, each primary feeder tube having a minimum cross-sectional area and having an outlet portion situated vertically higher than the nozzle through which the liquid is being discharged. A secondary feeder tube forms a part of each feeder conduit, each secondary feeder tube being open between the outlet portion of one of the primary feeder tubes and an upper inlet portion of its nozzle, each secondary feeder tube having an inner cross-sectional area throughout its length of substantially uniform dimension greater than the minimum cross-sectional area of its primary feeder tube, and each secondary feeder tube extending from the outlet portion of its primary feeder tube generally downwardly toward its nozzle.

Each feeder conduit is so configured as to form an upwardly extending feeder conduit loop, the primary feeder tube forming a substantial part of an upward run of that loop, the secondary feeder tube forming a substantial part of a downward run of that loop, the primary and secondary feeder tubes being joined to each other near the top of the loop.

A pair of adjacent, spaced-apart flow detector electrodes extend through an upper portion of the secondary feeder tube at position near the top of the feeder conduit loop and on the downward run of the loop, each electrode being electrically insulated from the other, and each terminating in adjacent relation to an opposite lowermost portion of the secondary feeder tube.

A separate indicating means for each conduit and each nozzle is positioned to be readily discernible by an operator of the apparatus; an electrical means is provided for monitoring the flow of electrons between each pair of flow detector electrodes, the electrical means being operative upon cessation of electron flow between any pair of electrodes to trigger or otherwise activate the indicating means associated with that conduit and that nozzle.

In the form of the invention as shown, that portion of the secondary feeder tube containing the two electrodes includes an independent flow detection section having barbed end portions which can be inserted into facing separated ends of the remainder of the secondary feeder tube to form an airtight and liquid-tight seal but which can still be rotated on the central longitudinal axis of the secondary feeder tube for easy adjustment of electrodes into an upright position during the initial construction of the liquid flow detector system.

BRIEF DESCRIPTION OF THE DRAWINGS

FIG. 3 is a fragmentary vertical longitudinal sectional view of the feeder tubes as seen in FIG. 2 showing the normal flow of liquid through those tubes during normal discharge of liquid through its nozzle;

FIG. 4 is a greatly enlarged vertical sectional view taken through a flow detection section of the secondary feed tube as seen in FIG. 3;

FIG. 5 is a fragmentary vertical sectional view similar to that of FIG. 3, but showing the nozzle of FIG. 2 and showing the positioning of the liquid in the feed tubes as when the nozzle becomes clogged or otherwise blocked to prevent flow through it; and FIG. 6 is a fragmentary circuit diagram of one means for indicating the absence of liquid flow individually through each of the nozzles.

DETAILED DESCRIPTION OF THE PREFERRED EMBODIMENTS

Figure 1:
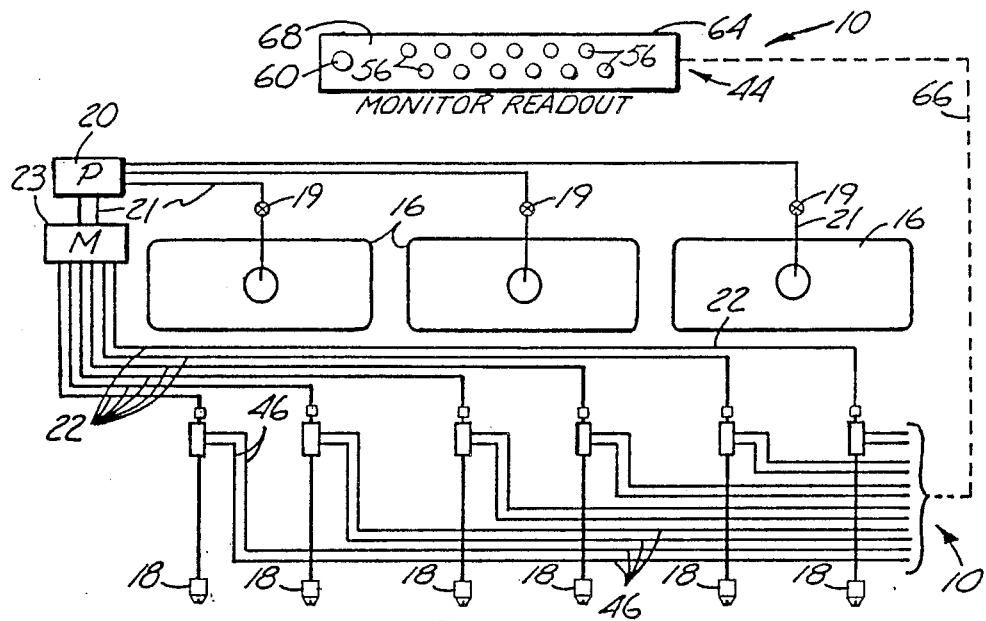
FIG. 1 is a schematic view of a liquid flow detector system for use with a wheel mounted field sprayer for applying electrically conductive agricultural chemical liquids to the ground through a plurality of feeder tubes to a plurality of spray heads or other nozzles.

A liquid flow detection system 10 of the present invention is disclosed for use with a farm or commercial sprayer 12 which includes a wheel mounted field sprayer body 14 having a generally horizontal frame member 15. Supported on the sprayer body 14 are a plurality of liquid agricultural chemical supply tanks 16 and a plurality of spray heads or nozzles 18. A liquid pump 20 receives liquids through appropriate cut-off valves 19 from a liquid supply conduit 21 and pumps that liquid simultaneously to a plurality of feeder conduits 22 through the instrumentality of a manifold 23.

This prior art structure is represented schematically in FIG. 1 as are certain of the elements of the present invention.

Figure 2:
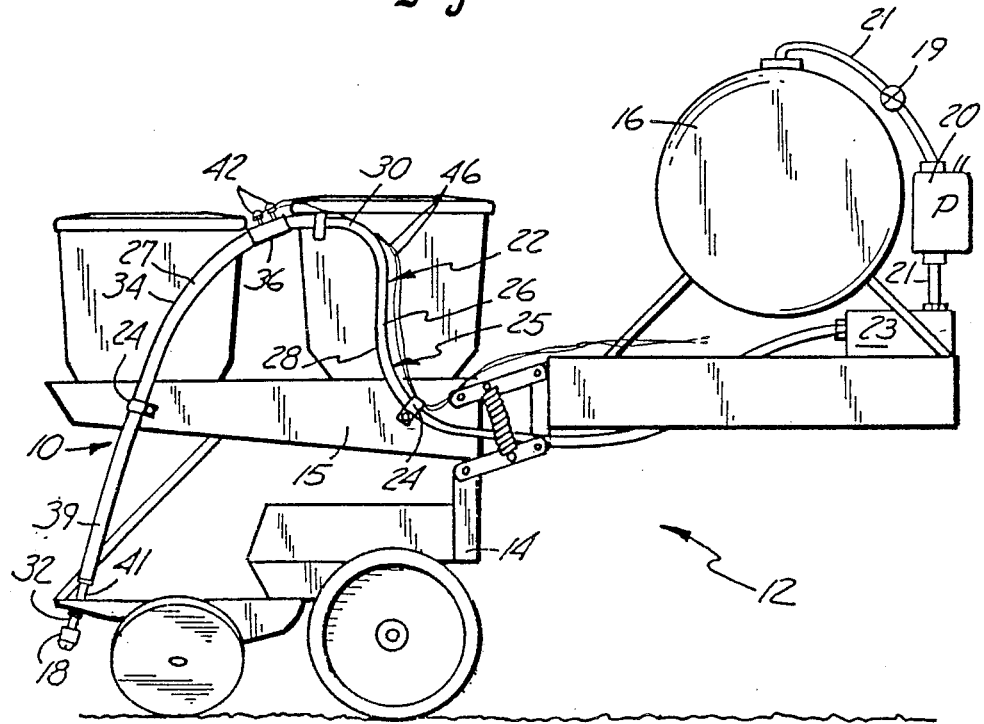
FIG. 2 is a side elevational view of most of the elements of one set of feeder tubes and nozzles of the fluid flow detector system mounted on a field sprayer body.

FIG. 2 is a greatly simplified illustration of most of the elements of such a farm sprayer 12, for example, but showing only one spray head 18, one supply tank 16 and one feeder conduit 22. Customarily, the wheel mounted field sprayer body 14 will be towed by an appropriate farm tractor (not shown) from the right as seen in FIG. 2. Also, the field sprayer 12 can customarily support one or more sprayer booms carrying spaced apart nozzles 18, each supplied by its own feeder conduit 22. These have been omitted for brevity and clarity of illustration.

The flow detection system 10 of the present invention includes a plurality of feeder conduits 22 each extending from the manifold 23 to one of a plurality of downwardly open nozzles 18. Each feeder conduit 22 includes a number of elements. Specifically, as seen in FIG. 2, that portion of the conduit 22 extending upwardly from a conduit holding bracket 24 on a forward portion of the frame 15 of the sprayer body 14 and then extending downwardly to a similar bracket 24 on a rearward portion of that frame is designated as an upwardly extending feeder conduit loop 25. This loop is divided into an upward run 26 and a downward run 27.

The portion of the feeder conduit 22 from the manifold 23 to a position adjacent the high point of the feeder conduit loop 25 is designated as a primary feeder tube 28 of the feeder conduit 22; while a portion of the feeder conduit 22 from this loop high point and extending smoothly downwardly toward an upper inlet portion 32 of the nozzle 18 is designated as a secondary feeder tube 34.

The secondary feeder tube 34 includes a flow detection section 36 which is located adjacent the uppermost point of the feeder conduit loop 26, but definitely in its downward run 27. This flow detection section can be an integral part of the secondary feeder tube 34, or can, as shown, be made from a nylon double barbed "hose mender" 38. The barbs are in the form of complete concentric rings, so that when installed as seen in FIG. 4, flow detection section 36 can be rotated with respect to the rest of the tube 34 while still retaining a liquid and air tight seal.

In the form of the invention as shown, the inner diameter of the primary feeder tube 28 will be substantially uniform. Without limitation of the invention to specific sizes, it has been found that a ½" plastic tube will serve well. The secondary feeder tube 34 is joined to an outlet end portion 30 of the primary feeder tube 28 by a reduce/enlarge adapter 40. The secondary feeder tube will have, over a substantial portion of its length, a larger cross-sectional area than the smallest cross-sectional area of the primary feeder tube 28. Again, without limitation of the invention to specific sizes, a ¾" tube has been found to be satisfactory for use as secondary feeder tube 34. While primary feeder tube 28 is said to have a uniform one-half inch inner diameter throughout its length, a single point along tube 28 of the same minimum cross-sectional area will have the same effect.

In the invention as shown, another feeder tube segment 41 of reduced diameter is seen, in FIG. 5 for example, to be open to a lower outer end portion 39 of the secondary feeder tube 34 through an adapter 40 and to the upper inlet portion 32 of the nozzle 18.

The flow detection section 36 of the secondary feeder tube 34 includes a pair of adjacent, spaced-apart flow detection electrodes 42,42. These electrodes extend through the uppermost surface of the flow detection section 36, are insulated from each other, and extend down into adjacent relation to the lowermost portion of section 36. To regulate the sensitivity of the system of the invention, electrodes 42,42 may be adjusted in their distance to the bottom of section 36 using the provided screw threads.

Means 44 for detecting and indicating the absence of electron flow between each pair of electrodes 42,42 includes a pair of electrical lead lines 46,46, each lead line attached to one of the electrodes 42 as at 48; a source of electromotive force such as a battery 50; and a "hot" buss wire 52 connected to a first side of the battery through a power "ON/OFF" switch 54. Light emitting diodes (LED) 56, one for each of the nozzles 18, are each connected on a first side to buss wire 52 on the side of switch 54 opposite the battery. A second side of each LED 56 is connected to a first one of each pair of the electrical lead lines 46, 46 associated with one of the nozzles 18. A "ground" buss wire 58 is connected to a second side of the battery 50; and the second one of each pair of lead lines 46,46 is connected to that "ground" buss wire 58.

A "Power On" indicator LED 60 is connected in series with a load resistor 62 across the battery 50 and the switch 54.

In the form of the invention as shown, the battery, switch, "hot" and "ground" buss wires, and the resistor 62 are housed in a combination junction box and visual display box 64 while all of the pairs of lead lines 46, 46 can be bundled into a cable 66 extending from the sprayer body 14 to the inside of junction box 64. The LED's 56 and the LED 60 are positioned to be visible through provided openings in a cover plate 68 of junction box 64. Representation of the cable 66 has been omitted from FIG. 2.

Alternatively, the battery 50 can be situated outside of the junction box 64, and could, in fact, be a battery used in the operation of the prime mover, for example.

OPERATION

When in use in normal operation, the appropriate cut-off valve 19 will be opened to access the desired liquid agricultural chemical in the proper liquid chemical supply tank 16, and the pump 20 will be activated to carry this liquid into manifold 23 from which it will be distributed to each of the feeder conduits 22, and through each of those conduits to flow out under the pressure of the pump through each of the nozzles 18.

With switch 54 in its "ON" condition, liquid under pressure will flow in each of the feeder conduits 22 up the upward run 26 of the upwardly extending feeder conduit loop 25, which is, at the same time, the primary feeder tube 28, and will flow or rush down through the flow detection section 36, through the larger secondary feeder tube 34 in the downward run 27 of the feeder conduit loop 25. Because of the positioning of the feeder conduit loop 25 and because the secondary feeder hose 34 is larger in diameter than the primary feeder hose 28, the liquid that comes rushing through the outlet portion 30 of the primary feeder hose cannot purge the air out of the secondary feeder hose. If the lower feeder tube segment 41 is of a smaller diameter than the secondary feeder hose 34, the pressure in the entrapped air in the second feeder hose will build up to be the same as the pressure in the feeder tube segment 41.

However, whether that feeder tube segment is of lesser diameter than secondary feeder tube 34 or not, the orifice in the spray heads or nozzles 18 will be of substantially less minimum outlet area than the minimum cross-sectional area of the primary feeder tube 28, so the pressure below the secondary feeder tube may well be set by the constriction of the orifice in the nozzle. In either case, no more liquid can flow in the secondary feeder tube than is flowing in the primary feeder tube, so the flow of that liquid will be substantially as indicated in FIGS. 3 and 4, with the liquid contacting, or slightly immersed in, the adjacent electrodes 42,42. As the voltage in the battery 50 is at that point applied across the electrodes 42,42 through LEDs 56, the flow of electrons through the liquid in contact with those electrodes will cause the associated LED to light up giving a visual indication that there is a flow of liquid through a nozzle 18. As is illustrated with great clarity in FIG. 4, the sensitivity of the apparatus can be adjusted by turning the threaded electrodes 42 clockwise down farther toward the bottom of the flow detector section 36 in order to insure that the associated LED comes on more quickly as the liquid flow commences. By turning each of the electrodes 42,42 in counterclockwise direction, the electrodes can be moved farther from the bottom of the flow detection section of the secondary feeder tube 34 thus insuring that the LED is extinguished at an earlier point in time as the flow through the nozzle is cut off for one reason or another.

A major reason for employing the apparatus of the invention is to determine immediately when any nozzle becomes clogged for any reason and, at least as important, to determine immediately which nozzle it is that is inoperative. When one nozzle becomes blocked, for example the nozzle illustrated in FIGS. 2 and 5, the liquid in the feeder conduit 22 from the top of the upwardly extending feeder conduit loop 25 will flow by gravity to position as seen to the left in FIG. 5. Since the air cannot escape, it will continue in its pressurized condition; and, in fact, the pressure of the air and of the liquid within the secondary feeder tube 34 and the remainder of that now blocked feeder conduit 22 will build up to the full pressure in the manifold 23. As soon as either one of the electrodes 42,42 is out of contact with the liquid, the LED associated with that nozzle will go dark, and the operator can immediately stop the operation of his sprayer to go to the aid of the clogged nozzle.

In the event of a failure in any portion of a feeder conduit 22 between its electrodes 42,42 and the manifold 23, no further liquid can reach the electrodes. As the liquid in the secondary feed tube 34 drains out through the nozzle by the action of gravity, as soon as the liquid is out of touch with either of the electrodes 42,42, the associated LED is extinguished. The operator will check the nozzle, and then that entire feeder conduit 22, and so determine why that nozzle was no longer delivering agricultural chemicals to the ground.

When there is a failure of one of the feeder conduits 22 anywhere between the two electrodes 42,42 to the nozzle 18, the LED associated with that failed line will not be immediately extinguished as, upon the removal of the back pressure of the nozzle, the liquid will flow freely through the remaining portions of the feeder conduit and will very probably remain in contact with the electrodes 42,42 of the failed conduit. However, it has been found in practice that the reduction in pressure because of the escape of liquid through the failed conduit is such that liquid flow through all of the other feeder conduits 22 becomes erratic, and all of the remaining LED's begin to flicker or go completely out as reduction in pressure and/or loss of fluid will cause flow through the other nozzles to fail. When the operator sees a first LED continuing to be lighted steadily, while all of the others to go erratic, the operator will know that there is a failure in the first conduit on the downstream side of its electrodes and he can take appropriate action to repair that first conduit at once.

Whenever the pump 20 is deactivated, or flow from manifold 23 is in any other way cut off, for example by running all of the liquid chemical out of a chemical supply tank 16, all of the liquid in the liquid flow detection system from the high point of the feeder conduit loop 25 will flow by gravity out through nozzle 18. This will allow the air supply in secondary feeder tube 34 (forming the downward run 27 in the loop 25) to be recharged. Since this happens each time the apparatus stops, there is never any question of the air being absorbed into the liquid to become "waterlogged" and inoperative.

Although the present invention has been described with reference to preferred embodiments, workers skilled in the art will recognize that changes may be made in form and detail without departing from the spirit and scope of the invention.

What is claimed is:

1. In an apparatus for moving a liquid with some electrical conductivity from a supply of such liquid simultaneously through a plurality of feeder conduits and out through a plurality of downwardly open nozzles; a liquid flow detector system for detecting and indicating to an operator of the apparatus, individually as to each of the nozzles, the absence of flow through that nozzle, wherein:
    (a) a primary feeder tube forms a part of each feeder conduit, each primary feeder tube having at least one point of minimum cross-sectional area along its length and having an outlet portion situated vertically higher than the nozzle;
    (b) a secondary feeder tube forms a part of each feeder conduit, each secondary feeder tube being open between the outlet portion of one of the primary feeder tubes and an upper inlet portion of its nozzle, each secondary feeder tube having an inner cross-sectional area throughout its length of substantially uniform dimension greater than the minimum inner cross-sectional area of its primary feeder tube, and each secondary feeder tube extending from the outlet portion of its primary feeder tube generally downwardly toward its nozzle;
    (c) each feeder conduit is so configured as to form an upwardly extending feeder conduit loop, the primary feeder tube forming a substantial part of an upward run of that loop, the secondary feeder tube forming a substantial part of a downward run of that loop, the primary and secondary feeder tubes being joined to each other near the top of the loop;
    (d) a pair of adjacent, spaced-apart flow detector electrodes extend through an upper portion of each secondary feeder tube in position near the top of the feeder conduit loop and on the downward run of the loop, each electrode being electrically insulated from the other, and each terminating in adjacent relation to an opposite lowermost portion of the secondary feeder tube;
    (e) a separate indicating means for each conduit is positioned to be readily discernible by an operator of the apparatus; and
    (f) electrical means is provided for monitoring the flow of electrons between each of pair of flow detector electrodes, said electrical means being operative upon cessation of electron flow between any pair of electrodes, to trigger the indicating means associated with that conduit.

2. The flow detector system of claim 1 wherein:
    (g) that portion of the secondary feeder tube containing the two electrodes includes an independent flow detection section having concentric ring-like barbs on opposite end portions which can be inserted into intermediate facing separated ends of the secondary feeder tube to form an airtight and liquid-tight seal but which can still be rotated on the central longitudinal axis of the secondary feeder tube to permit rotation of the flow detection system with respect to the rest of the secondary feeder tube for easy adjustment of the electrodes into an upright position.

3. The liquid flow detection system of claim 1 wherein:
    (g) the indicating means include an electric light for each nozzle; and
    (h) the electrical flow monitoring means includes means for energizing and deenergizing each light responsive to flow and lack of flow between the flow detector electrodes associated with that light.

4. The liquid flow detector system of claim 3 wherein:
    (i) each electric light is a light emitting diode.

5. The liquid flow detector system of claim 1 wherein:
    (g) at least one of the flow detector electrodes is adjustably mounted with respect to the secondary feeder tube so that the distance between the electrode and the lowermost portion of the secondary feeder tube can be varied.

6. The liquid flow detector system of claim 5 wherein;
    (h) the flow detector electrodes are threadably mounted in said secondary feeder tube.

7. In an apparatus for moving a liquid with some electrical conductivity from a supply of such liquid simultaneously through a plurality of feeder conduits and out through a plurality of downwardly open nozzles; a liquid flow detector system for detecting and indicating to an operator of the apparatus, individually as to each of the nozzles, the absence of flow through that nozzle, wherein:
    (a) a primary feeder tube forms a part of each feeder conduit, each primary feeder tube having a minimum cross-sectional area and having an outlet portion;
    (b) a secondary feeder tube forms a part of each feeder conduit, each secondary feeder tube being open between the outlet portion of one of the primary feeder tubes and an upper inlet portion of its nozzle, each secondary feeder tube having an inner cross-sectional area throughout its length of substantially uniform dimension greater than the minimum inner cross-sectional area of its primary feeder tube;
    (c) each feeder conduit is so configured as to form an upwardly extending feeder conduit loop extending to a position vertically above its nozzle, the secondary feeder tube forming a substantial part of a downward run of that loop;

(d) a pair of adjacent, spaced-apart flow detector electrodes extend through an upper portion of each secondary feeder tube in position near the top of the feeder conduit loop vertically above its nozzle and o the downward run of the loop, each electrode being electrically insulated from the other, and each terminating in adjacent relation to an opposite lowermost portion of the secondary feeder tube;

(e) a separate indicating means for each conduit is positioned to be readily discernible by an operator of the apparatus; and (f) electrical means is provided for monitoring the flow of electrons between each of pair of flow detector electrodes, said electrical means being operative upon cessation of electron flow between any pair of electrodes, to trigger the indicating means associated with that conduit.

* * * * *